G. SCHNABL.
AUTOMATIC WEIGHING SCALE.
APPLICATION FILED NOV. 26, 1909.
1,080,374.
Patented Dec. 2, 1913.
2 SHEETS—SHEET 1.
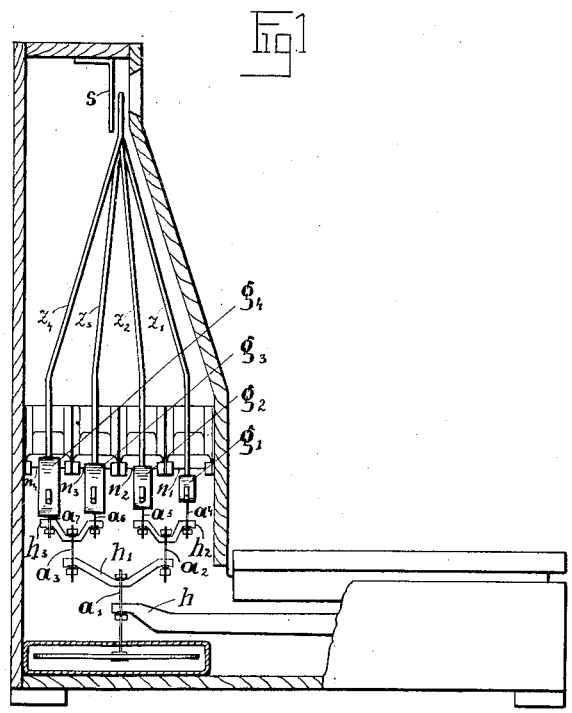
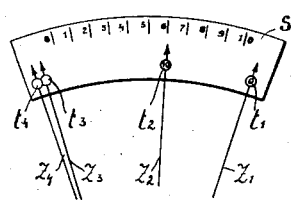
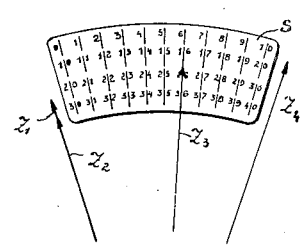
Witnesses
Inventor
Gustav Schnabl

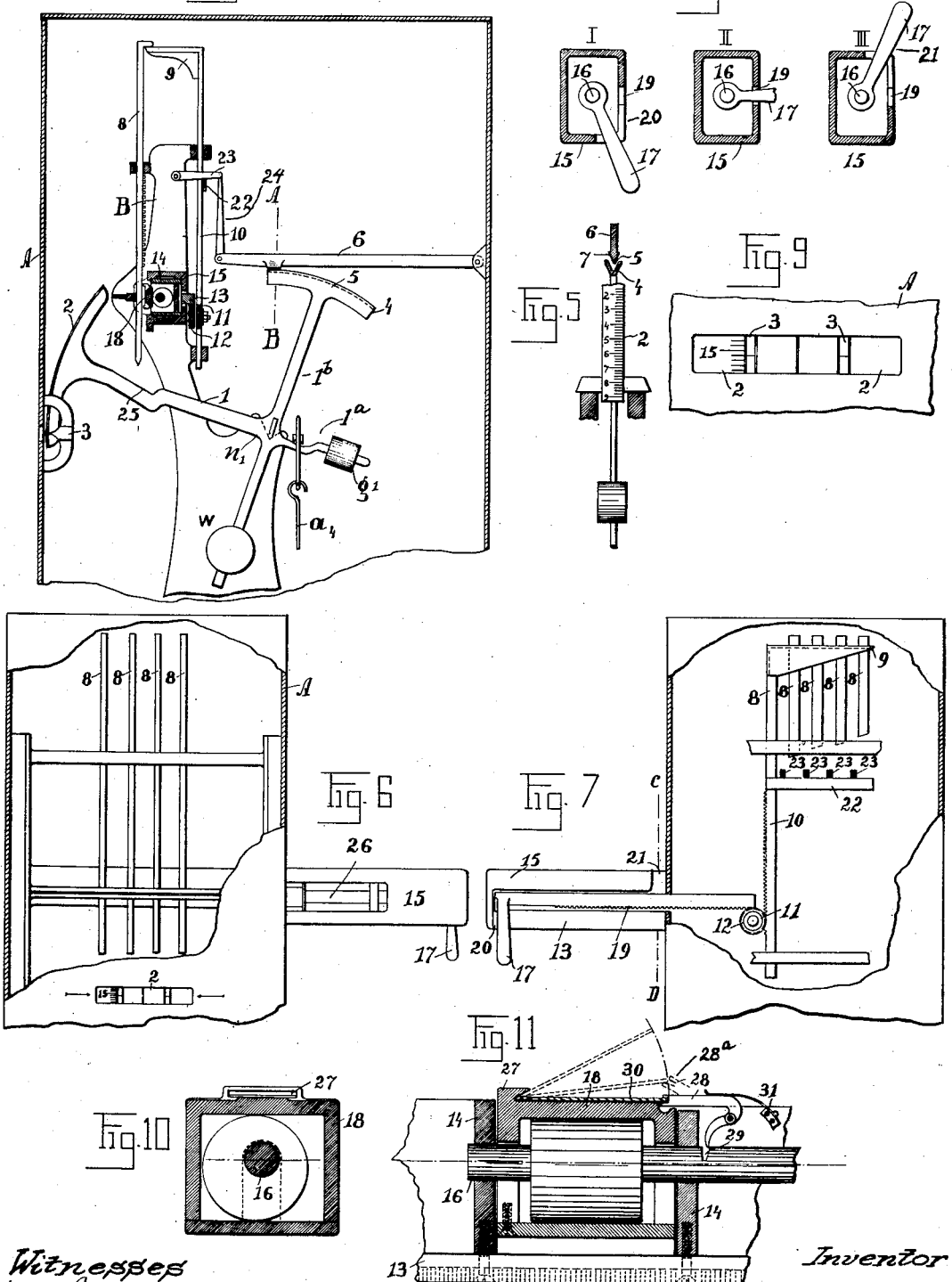

UNITED STATES PATENT OFFICE.

GUSTAV SCHNABL, OF ATZGERSDORF, NEAR VIENNA, AUSTRIA-HUNGARY, ASSIGNOR TO C. SCHEMBER & SÖHNE, OF ATZGERSDORF, NEAR VIENNA, AUSTRIA-HUNGARY.

AUTOMATIC WEIGHING-SCALE.

1,080,374.  Specification of Letters Patent.  Patented Dec. 2, 1913.

Application filed November 26, 1909. Serial No. 530,024.

*To all whom it may concern:*

Be it known that I, GUSTAV SCHNABL, a subject of the Emperor of Austria-Hungary, residing at Atzgersdorf, near Vienna, Austria-Hungary, have invented new and useful Improvements in Automatic Weighing-Scales, of which the following is a specification.

This invention relates to weighing scales having a plurality of mechanical scale devices which are actuated, through a suitable system of levers, by the load being weighed on the scale platform, and has for its object to indicate the weight automatically of comparatively large and small loads, accurately, and register a printed record of same simultaneously, and at the same time have the mechanism relatively easy to adjust and inexpensive to construct.

With these objects in view and further objects which will appear as the nature of my invention is more fully set forth, I have produced a device which embodies my invention as hereinafter described and shown in the annexed drawings in which:

Figure 1 indicates a longitudinal sectional view of the scales in general form. Fig. 2 indicates a form of indicator. Fig. 3 indicates another form of indicator. Fig. 4 shows a detail view of the improved indicating and recording mechanism of the scales. Fig. 5 is a detail view of the mechanism through A—B, Fig. 4. Fig. 6 is a detail view of the front of the type bars. Fig. 7, is a detail side view of the type bars. Fig. 8 shows the operating handle in different positions. Fig. 9 is a detail of the weight indicator. Fig. 10 is a detail transverse sectional view of the ticket slide attachment. Fig. 11 is a detail longitudinal sectional view of ticket slide attachment.

Similar reference characters refer to corresponding parts throughout the several views.

A lever attached to the scale platform transmits the effect of the load through the intermediate lever $h'$ by means of the link $a'$, and through the intermediate levers $h^2$ and $h^3$ by means of the links $a^2$ and $a^3$ respectively, which latter in turn transmit the effect to the mechanical scale devices $n'$, $n^2$, $n^3$, and $n^4$. The intermediate levers being equal in general respects, they each take care of an equal amount of the load.

The scale devices $n'$, $n^2$, $n^3$, and $n^4$ are arranged with the indicating attachments $z'$, $z^2$, $z^3$ and $z^4$, and the weights $g'$, $g^2$, $g^3$ and $g^4$ which latter are preferably of different sizes and act against the effect of the load on the scale platform, and also with the pendulum weights $w'$, $w^2$, $w^3$ and $w^4$ which assist in adjusting the action of the mentioned devices. Therefore a given load on the scale platform will primarily act on the balance scale having the smallest weight; as the load increases with the next larger weights ($g^2$) and so on, until that scale which together with its weight just counterbalances the effect of the load is reached. For example, assuming the apparatus is constructed for weighing loads up to 40 pounds, and the weights are graduated to counterbalance from 10 pounds upward by differences of 10 pounds, *i. e.* so that the scale device $n'$ is actuated with 10 pounds, $n^2$ with 20 pounds and $n^3$ with 30 pounds and $n^4$ with 40 pounds, so that with a load of 16 pounds, it can readily be seen that the effect will first act on scale device $n'$ and move its attached indicator to its ($n'$) limit. As only 10 pounds are or can be counterbalanced by the first scale device the action will continue to the next scale device ($n^2$) until it counterbalances the remaining 6 pounds, which it will do when its indicator has moved over six-tenths of its movement, as shown in Fig. 2. In case it is preferred to obviate this addition (see Fig. 2) on the indicator plate of 10+6 to obtain 16 (or whatever the load is) directly, a plurality of indications are arranged one below the other (see Fig. 3) the lower ones forming the continuation of the ones above them, and the indicator arranged to indicate the load directly as clearly shown in Fig. 3. The arrangement of the indicator arm 1 of the scale is further improved by providing the scale device $n'$ with adjustable weights $g'$ on its arm $1^a$ which is perpendicular to the direction of the same indicator with the segment 2, that is, to its plane of oscillation, this segment 2 has a graduated scale marked on its front side for giving an indication of the result of the weighing which will be referred to in a later part of the specification.

A is a casing covering the works of the scale.

For the purpose of locking the scale while it is indicating the load on its platform an arm $1^b$ is provided with a curved piece 4 having a wedge groove 5, into which the wedge 7 projects; the scale device is locked in position by pressing the wedge into this groove, this operation being accomplished simultaneously with the action of the recording mechanism which consists of the type bar 8 adapted to move vertically over the arm 1 of each scale device. A projecting piece 9 which moves said type bar is attached to a rack 10 and is likewise vertically disposed and actuated by the pinion 11. The rack 10 is guided in the guide block B and carries a cross arm 22 which supports the pivoted levers 23; the levers 23 hold the brake or the locking levers 6 connected thereto by rods 24 in a raised position. Pinion 11 is coupled with another pinion 12 which is in engagement with a rack 13 connected with ticket slide 14, the slide 14 runs in a guide 15 attached to the casing A and is arranged to receive a stamp block 18, which can be moved to and fro between the sides of slide by means of an eccentric 16 arranged therein. A handle 17 being attached to the eccentric shaft 16ª for the purpose of actuating it, and its guide 15 is provided with a longitudinal slot 19 and transverse slots 20 and 21 situated at each end thereof. A holder piece 27 is provided on the stamp block which is grooved to receive the edge of the ticket, opposite this piece is a double lever carrier 28, which is pivotally mounted and held to the slide 14 a recess is arranged on the front face of this lever for the insertion of the ticket and the second lever 28' attached to it is arranged to extend into the recess 29 provided in the eccentric shaft. The type bar 8 has on its lower end, a knife edge running parallel to the turning edge of the balance scale, opposite to which on the scale arm 1 is provided a special contact surface 25, arrangements being made so that equal differences in the weight in the load produce equal movements of the bars, whereby the distances of the types from one another can be made equal.

The action in connection with recording the result of the weighing is as follows: A ticket 30 is put near the part 26 with one edge in the slot 27 and the opposite edge in the recess 28ª of the carrier 28, which is in the position indicated by a dotted line. The handle is then actuated and turned from position I Fig. 8 to position II. In consequence of the cam shaped surface 29, the carrier is turned and the ticket is pressed against the stamp block 18, and held firmly in that position. When the handle 17 is in the position II it has left the transverse slot 20, so that the slide and the rack 13 connected thereto can move horizontally; by this movement pinions 12 and 11 are rotated and the rack 10 is moved downward, and levers 23 deprived of their support 22, causing arms 6 to descend and the wedges thereof to press into the grooves 5, thereby locking the scale devices in the position they are in. The type bars in consequence of their weight follow the movement of the rack and arrive at their limit of action on the surface 25 of scale arm 1, thereby causing the figures corresponding to the result of the weighing, to be adjusted opposite the recording figure; for this purpose the limit of the longitudinal slot and the distance that slots 20 and 21 are arranged apart is such that the rack 10 can be lowered sufficiently to bring the type bars into the position previously indicated before the handle 17 is at the slot 21 and turned into position III. While the turning takes place the ticket is pressed against the figures of the type bar through the medium of the stamp block and the result of the weighing is marked on the ticket. The stamped tickets are removed by returning the handle from the position III to position II which takes the type bars out of printing contact with the ticket, then moving the slide into slot 20, and finally turning the handle to the position I, thereby releasing the ticket from the carriers 28 (which have again assumed the position indicated by a dotted line) and then ejecting it. Simultaneously the type bars are returned to their starting positions, the brake locks are lifted and the scale devices released. As the ticket is only delivered after all the operations with the lever have been effected, that is the longitudinal and transverse movements, the return of all the parts to their original positions is assured.

Having thus described my invention I claim:

1. In an automatic weighing scale in combination with the main scale beam, a plurality of intermediate levers, a transmission system of a weighing mechanism adapted to be operated by said scale beam for actuating said intermediate levers, a plurality of mechanical scale devices, means for actuating said scale devices by said levers, a plurality of graduated weights arranged to oppose the effect of the weighing mechanism on said devices, means connected with said devices for indicating the weight thereon, and means influenced by said devices for recording said indicating weight.

2. In an automatic weighing scale the combination with the main scale beam, of a plurality of intermediate levers, a transmission system of a weighing mechanism adapted to be operated by said scale beam, a plurality of mechanical scale devices, means for actuating said scale devices by said levers, a plurality of graduated weights disposed on said devices and arranged to oppose the effect of the weighing mechanism thereon, means on said devices for indicating the weight thereon, a recording device to print said indicated weight, and means for controlling the actuation of the recording device by the weighing device.

3. In an automatic weighing scale, in combination with the main scale beam, a plurality of intermediate levers, a transmission system of a weighing mechanism adapted to be operated by said scale beam for actuating said intermediate levers, a plurality of mechanical scale devices, means for actuating said scale devices by said levers, a plurality of graduated weights disposed on said devices and arranged to oppose the effect of the weighing mechanism thereon, means on said devices for indicating the weight thereon, means for recording said indicated weight, means for controlling the actuation of the recording device by the weighing device, and braking means for locking said device in a registering position.

4. In an automatic weighing and registering scale in combination with the main scale beam, a plurality of intermediate levers, a transmission lever system of a weighing mechanism adapted to be operated by said scale beam for actuating said intermediate levers, a plurality of mechanical scale devices, means for actuating said scale devices by said levers, said devices having a plurality of arms thereon, a portion of said arms having segmental projections thereon provided with wedged shape grooves therein, a portion of said arms having means for indicating the weight thereon, a portion of said arms having graduated weights thereon, arranged to oppose the effect of said system on said device, and a portion of said arms having an adjustable weight thereon, a lever having a wedge projection thereon adapted to engage in said groove and lock said device in position, a recording mechanism, means for influencing said recording and said locking devices, and means for controlling the actuation of the recording device by the weighing device.

5. In a mechanical scale device in automatic weighing scales, the combination of a plurality of levers, a transmission system of a weighing mechanism adapted to be operated by said scale beam for actuating said levers, a plurality of mechanical scale devices, means for actuating said scale devices by said levers, a plurality of arms a portion of which having grooves therein arranged for brake members, a portion having means to counteract the effect of the weighing mechanism of the system of levers, a recording mechanism, means for influencing said braking and recording mechanism, and means for controlling the actuation of the recording device by the weighing device, substantially as described.

In testimony whereof I affix my signature in presence of two witnesses.

GUSTAV SCHNABL.

Witnesses:
 IGNAZ KNORFELMACH,
 AUGUST FUGGER.